No. 887,277. PATENTED MAY 12, 1908.
W. C. SHINN.
MACHINE FOR MAKING CABLE LIGHTNING RODS.
APPLICATION FILED FEB. 28, 1907.
6 SHEETS—SHEET 1.
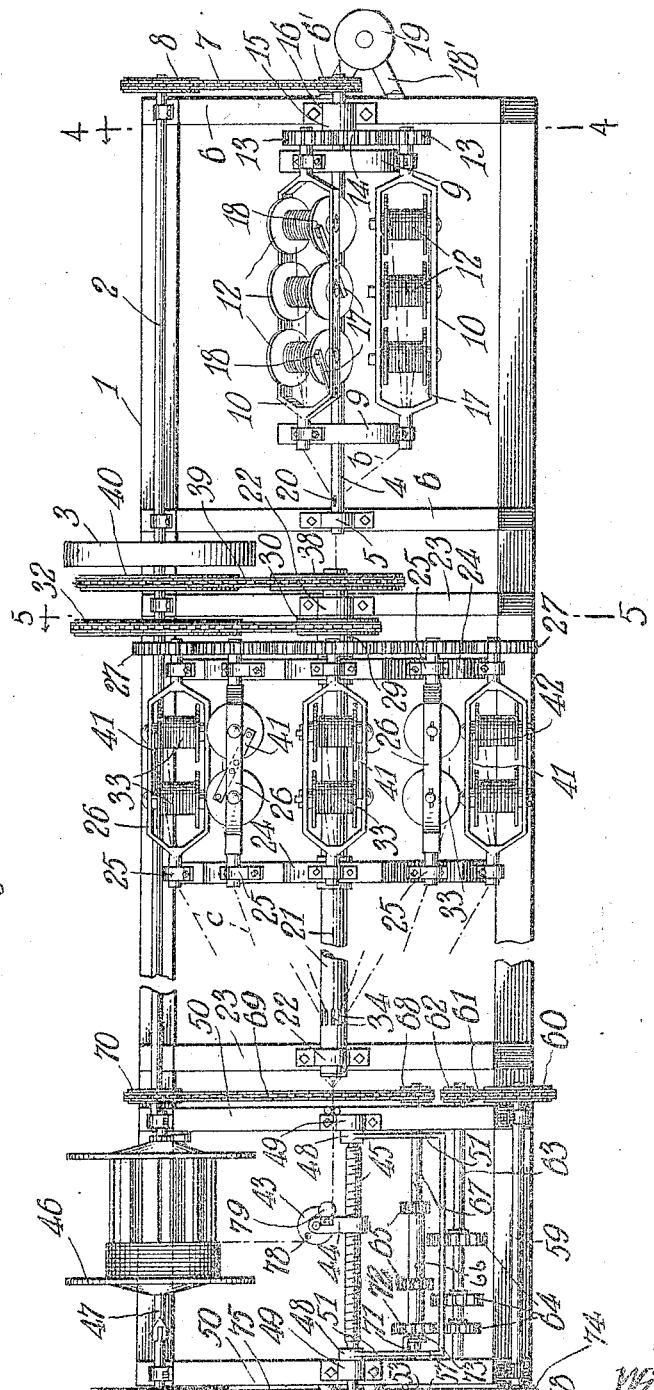
Witnesses
C. E. Smith
C. H. Griesbauer
Inventor
William C. Shinn
by H. A. Wilson & Co.
Attorneys

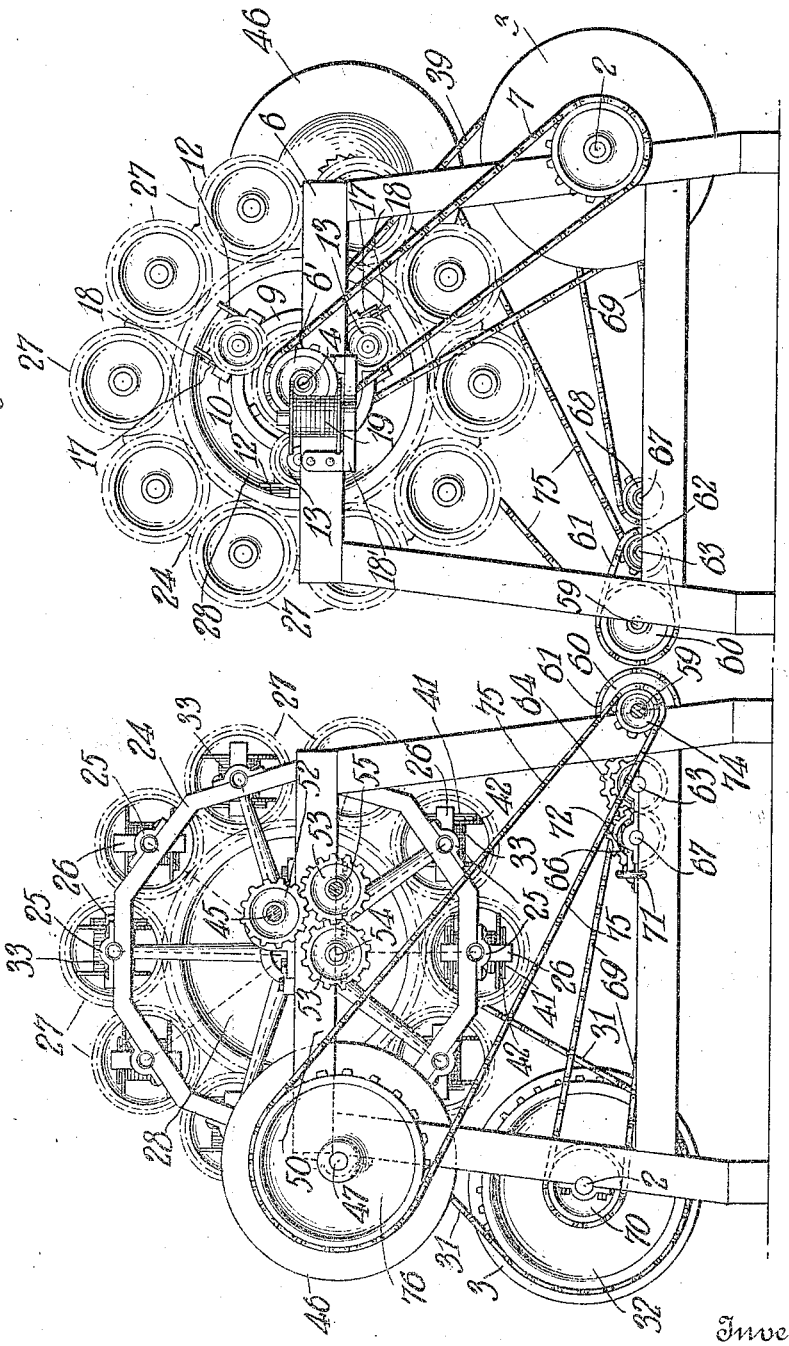

No. 887,277. PATENTED MAY 12, 1908.
W. C. SHINN.
MACHINE FOR MAKING CABLE LIGHTNING RODS.
APPLICATION FILED FEB. 28, 1907.
6 SHEETS—SHEET 3.
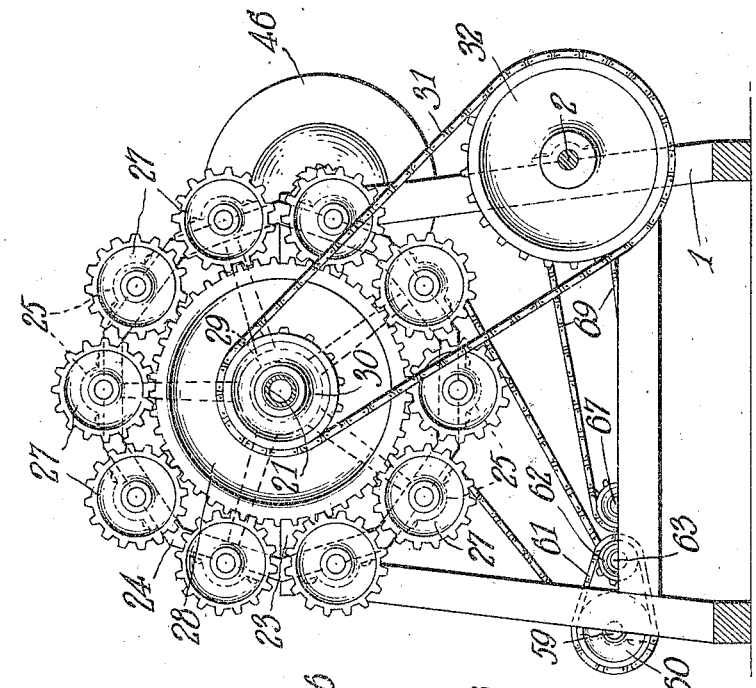
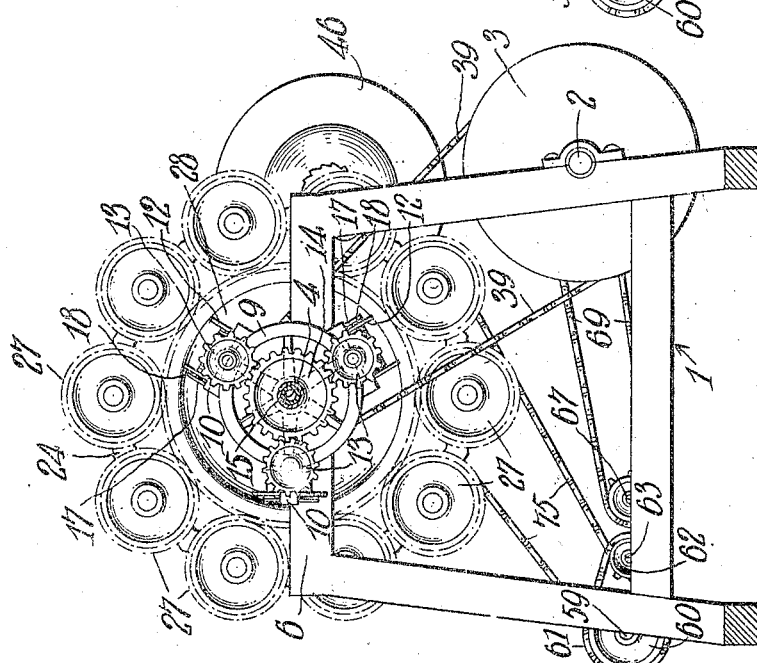
Witnesses
C. E. Smith.
E. H. Griesbauer.
Inventor
William C. Shinn.
by H. B. Willson & Co
Attorneys No. 887,277. PATENTED MAY 12, 1908.
W. C. SHINN.
MACHINE FOR MAKING CABLE LIGHTNING RODS.
APPLICATION FILED FEB. 28, 1907.
6 SHEETS—SHEET 4.
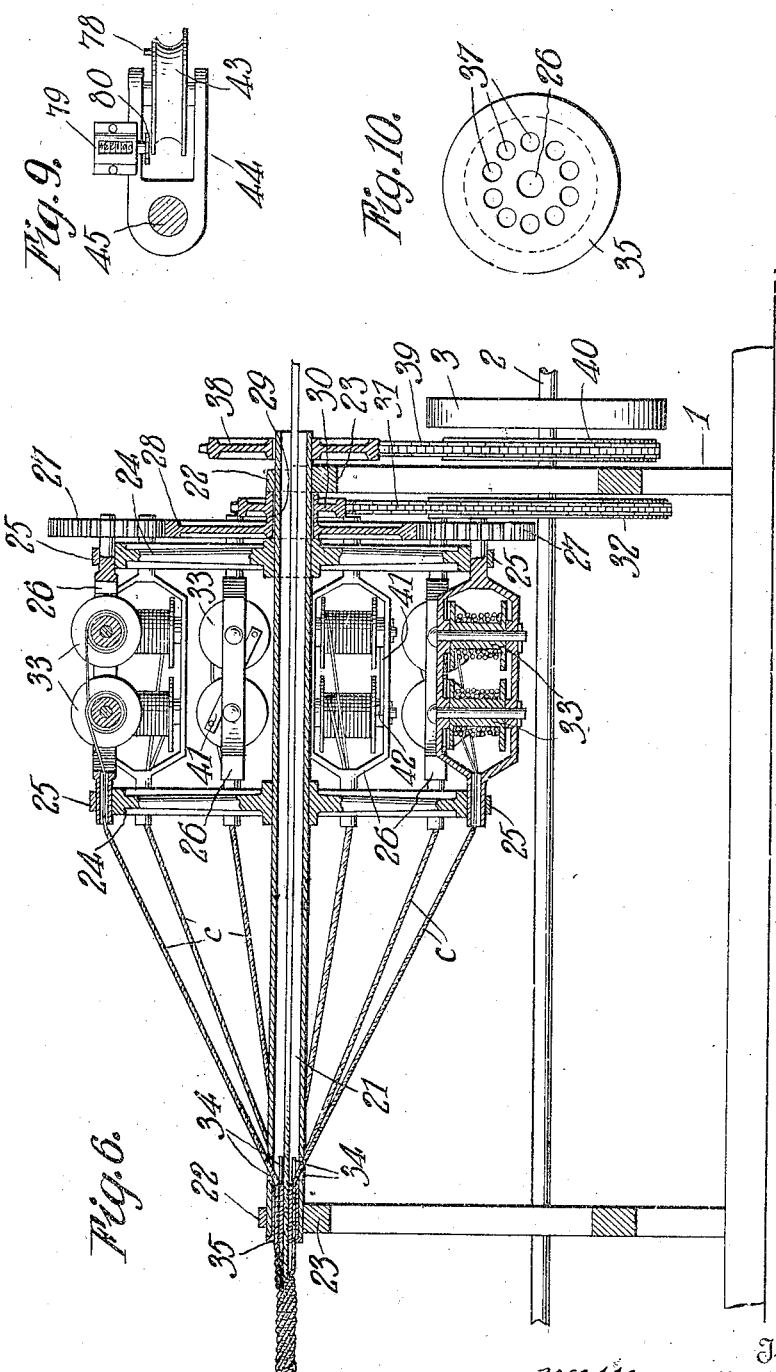
Witnesses
C. E. Smith
C. H. Griesbauer
Inventor
William C. Shinn.
by H. B. Willson & Co.
Attorneys No. 887,277.
PATENTED MAY 12, 1908.
W. C. SHINN.
MACHINE FOR MAKING CABLE LIGHTNING RODS.
APPLICATION FILED FEB. 28, 1907.
6 SHEETS—SHEET 5.
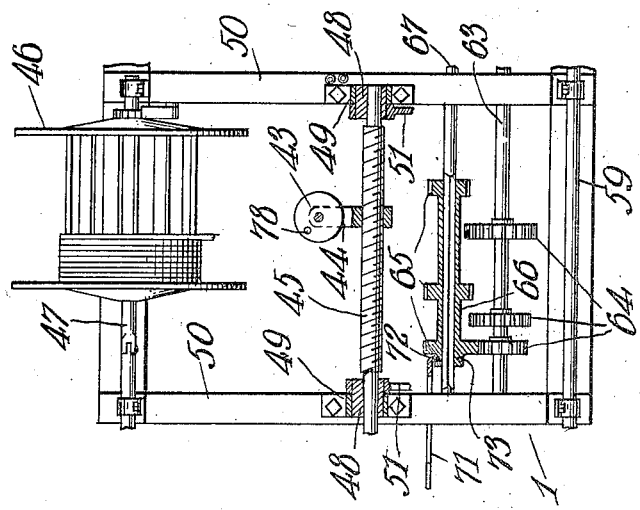
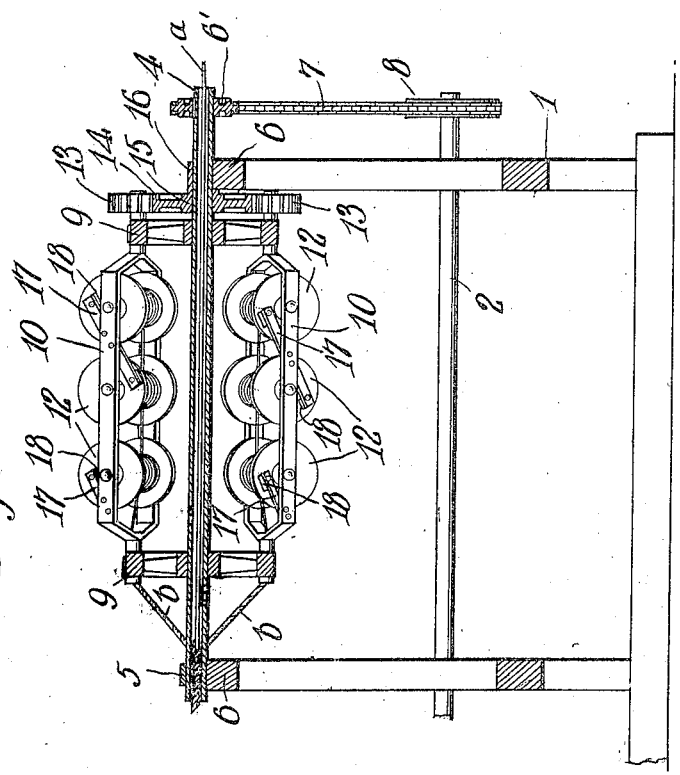
Witnesses
C. E. Smith.
C. H. Griesbauer.
Inventor
William C. Shinn.
by H. B. Willson & Co
Attorneys No. 887,277. PATENTED MAY 12, 1908.
W. C. SHINN.
MACHINE FOR MAKING CABLE LIGHTNING RODS.
APPLICATION FILED FEB. 28, 1907.
6 SHEETS—SHEET 6.
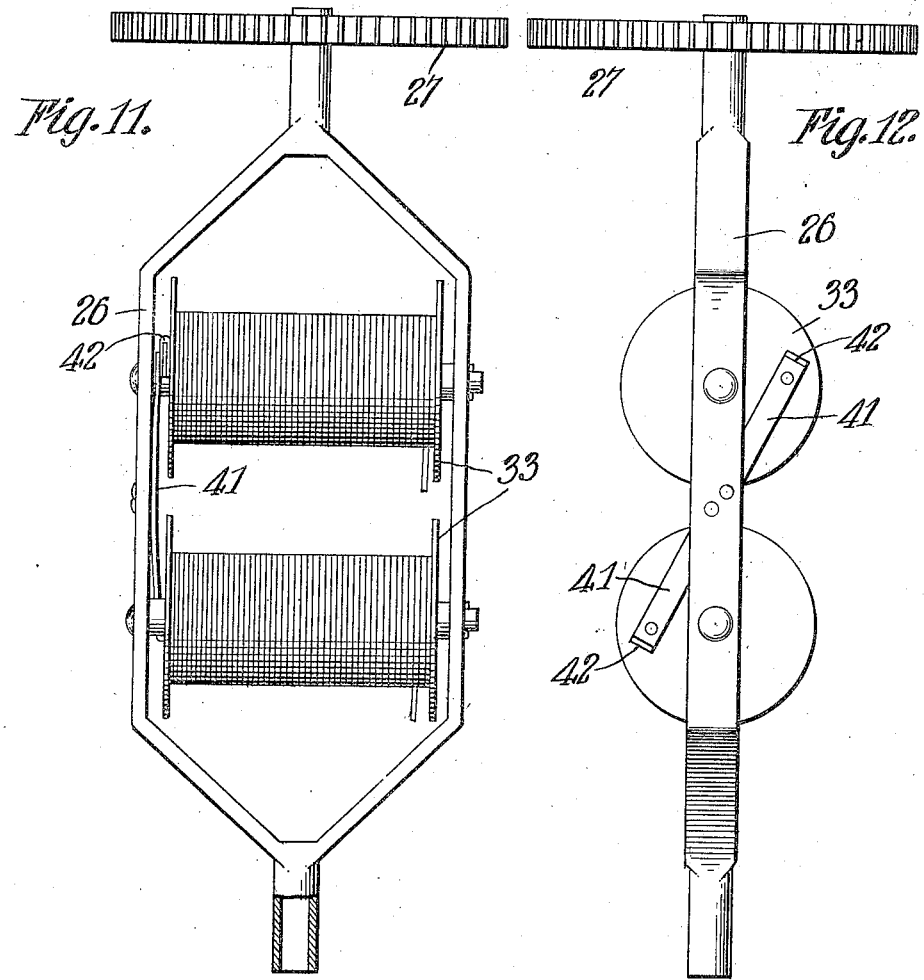
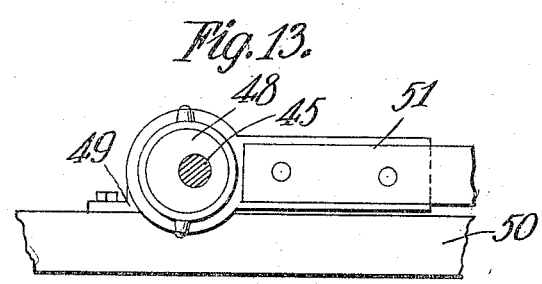
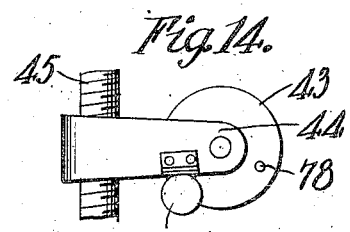
Witnesses
C. E. Smith
C. H. Griesbauer
Inventor
William C. Shinn.
by H. R. Willson & Co.
Attorneys

UNITED STATES PATENT OFFICE.

WILLIAM C. SHINN, OF LINCOLN, NEBRASKA.

MACHINE FOR MAKING CABLE LIGHTNING-RODS.

No. 887,277.  Specification of Letters Patent.  Patented May 12, 1908.

Application filed February 28, 1907.  Serial No. 359,936.

*To all whom it may concern:*

Be it known that I, WILLIAM C. SHINN, a citizen of the United States, residing at Lincoln, in the county of Lancaster and State of Nebraska, have invented certain new and useful Improvements in Machines for Making Cable Lightning-Rods; and I do declare the following to be a full, clear, and exact description of the invention, such as will enable others skilled in the art to which it appertains to make and use the same.

This invention relates to improvements in machines for making cable lightning rods.

The object of the invention is to provide a machine of this character for the purpose of producing a cable within a cable, to form a smooth, flexible lightning rod possessing a maximum amount of surface for the many wires in its construction, thereby greatly increasing the conducting qualities of the rods.

With the above and other objects in view, the invention consists of certain novel features of construction, combination and arrangement of parts, as will be hereinafter described and claimed.

In the accompanying drawings:—Figure 1 is a plan view of a lightning rod machine constructed in accordance with the invention; Fig. 2 is an end elevation of one end of the machine; Fig. 3 is a similar view of the opposite end; Fig. 4 is a vertical cross sectional view on the line 4—4 of Fig. 1; Fig. 5 is a similar view on the line 5—5 of Fig. 1; Fig. 6 is a central vertical longitudinal sectional view through that portion of the machine for forming the inner cable; Fig. 7 is a similar view of that portion of the machine for forming the outer cable around the inner cable; Fig. 8 is an enlarged plan view of that portion of the machine containing the reeling and measuring mechanism; Fig. 9 is a detail cross sectional view through the screw shaft for adjusting the cable guiding pulleys, looking toward the edge of the same; Fig. 10 is an enlarged detail view of the outer cable winding die; Fig. 11 is an enlarged detail plan view of one of the spool frames and spools of the outer cable winding mechanism, showing the arrangement of the tension device for said spools; Fig. 12 is a side view of the same; Fig. 13 is a detail end view of the adjusting screw shaft for the cable guide pulley, showing one of the eccentric bearing boxes by means of which said shaft and its operating gear are shifted to reverse the movement of the same; Fig. 14 is a detail view of the measuring and registering device carried by the adjustable cable guide pulleys; and Fig. 15 is a detail view, showing the structure of the cable formed by the machine.

Referring more particularly to the drawings, 1 denotes the supporting frame of the machine, on one side of which is mounted a main drive shaft 2, upon which is fixed a drive pulley 3. The driving pulley 3 on said shaft 2 is connected to a suitable operating mechanism by means of which the machine is driven.

In one end of the machine is arranged an inner cable forming mechanism, consisting of a tubular shaft 4 revolubly-mounted in bearings 5 on the parallel cross bars 6 of the frame 1. On the outer end of the shaft 4 is mounted a sprocket wheel 6', which is connected by a sprocket chain 7 to a sprocket wheel 8 on the end of the main drive shaft 2 of the machine. Fixedly-mounted on the shaft 4 and spaced apart at a suitable distance are circular frames 9, between which and journaled in suitable bearings on the outer edges of said frames are radially-disposed wire twisting and spool carrying frames 10. In each of the frames 10 are revolubly-mounted a series of wire holding spools 12, three of which are shown in the present instance as arranged in each of the frames 10. The journals at the inner ends of the frames 10 are tubular, and through said tubular journals are carried the ends of the wires from the spools mounted therein.

The journals at the opposite ends of the frames 10 project beyond the circular supporting frame 9, upon which they are mounted, and on the ends of said journals are fixed gear pinions 13. The pinions 13 are adapted to engage a circular rack or fixed gear 14, which is rigidly-mounted upon a sleeve 15 arranged on the journal bearing 16 of the shaft 4.

The wire twisting and spool holding frames 10 are provided on one side with tension springs 17, said springs having on their ends suitable friction blocks 18 adapted to engage one end of the spools 12 to retard the movement of the same.

Revolubly-mounted upon a bearing bracket 18' on the end of the frame 2 is a wire holding spool 19, the wire from which is carried through the tubular shaft 4 to form the inner strand or wire *a* of the cable. In the shaft 4 adjacent to its inner end is formed a series of radially-disposed slots 20, through which the three-ply twisted strands of wire $b$ formed by the wire twisting frames 10 carrying the spools 12 are passed. The twisted strands of wire $b$ after passing through the slots 20 are wound upon the single inner wire strand from the spool 19 by the revolving of the shaft 4 in its bearings on the frame of the machine. The wires from the spools 12 in the frames 10 are twisted together to form the strands $b$ by the turning of the frames 10 which are revolved independently of the shaft 4 through the engagement of the gear pinions 13 on the ends of said frame with the fixed gear or circular rack 14 as said frames are carried around by the revolution of the shaft 4, as will be understood.

The single wire strand $a$ when wrapped or wound by the three-ply strands $b$ forms the inner cable for the rod, said inner cable after passing from the end of the tubular shaft 4 engages the outer cable forming mechanism. The outer cable forming mechanism consists of a centrally-disposed tubular shaft 21, which is revolubly-mounted in bearings 22 on cross bars 23 of the supporting frame. On the shaft 21 is mounted a pair of polygonal bearing frames 24 which are spaced apart and are provided on their edges with a series of journal bearings 25. In the bearings 25 are revolubly-mounted the reduced ends of combined wire twisting and spool carrying frames 26, of which there may be any desired number, ten of the same being shown in the present instance. The journals at one end of the frames 26 project beyond the adjacent supporting frame 24 and have fixedly-mounted thereon gear pinions 27, which are engaged with and revolved by a large gear wheel 28 fixed on a bearing sleeve 29 loosely mounted on the tubular shaft 21. On the opposite end of the sleeve 29 is fixed a sprocket wheel 30. The sprocket wheel 30 is connected by a sprocket chain 31 to a sprocket wheel 32 on the main drive shaft 2 of the machine, whereby said large gear 28 is revolved, and which in turn revolves the gears 27 and the wire twisting frames 26.

In each of the frames 26 is revolubly-mounted two wire holding spools 33, upon which are wound the wires for forming the outer cable. The journals of the frames 26 at the opposite ends from the gear wheels 27 are tubular, and through said tubular journals are passed the wires from the spools 33, said wires being twisted together by the frames 26 to form the outer two-ply strands $c$ of the cable. The strands $c$ after passing from the tubular journals of the frames 26 enter slots 34 formed in the end of the tubular shaft 21 and from thence pass through the winding or wrapping die 35 arranged in the end of the shaft 21. The die 35 consists of a circular block having formed therein a centrally-disposed aperture or passage 26, through which the inner cable passes, said cable extending through the tubular shaft 21 from its forming mechanism, as hereinbefore described. The block or die 35 is also provided with an annular series of apertures 37 arranged around the central aperture 36, as shown. The two-ply strands $c$ after entering through the slots 34 into the shaft 21 pass through the apertures 37 of the die and are wound upon the inner cable by the revolution of the shaft 21 and the die 35. The shaft 21 is provided on its opposite end with a sprocket wheel 38 connected by a sprocket chain 39 with a sprocket wheel 40 fixedly-mounted on the main drive shaft 2 of the machine, whereby the shaft 21 and the die 35 is revolved. The twisting frames 26 are provided with tension springs 41 having friction blocks 42 to engage one end of the spools 33 to retard the movement of the same.

The cable after being completed by the winding die 35 passes through a spooling or reeling mechanism arranged on the frame 1 and consisting of a guide pulley 43 revolubly-mounted in a pulley block 44 having formed therein a threaded aperture by means of which it is adjustably-mounted upon a screw-threaded shaft 45 by means of which said block and pulley are shifted back and forth to evenly guide and feed the cable to a spool or reel 46. The spool or reel 46 is mounted upon a reel shaft 47 journaled in bearings on the frame 1 of the machine.

The screw shaft 45 is eccentrically-mounted in bearing disks 48, which are revolubly-mounted in bearings 49 on the cross bars 50 of the frame. The disks 48 are provided with suitable handles 51, by means of which they may be turned to move the shaft 45 and to shift the gear pinion 52, which is mounted on one end of the shaft into engagement with one or the other of a pair of intermeshing driving gears 53, which are mounted on stub-shafts 54 and 55 journaled in suitable bearings on the frame of the machine, thereby changing the direction of rotation of the shaft 45 to cause the latter to move the guide block 44 and pulley 43 back and forth, thus causing the cable to be evenly wound back and forth across the reel or spool 46, as will be readily understood by reference to Fig. 8 of the drawings.

The handles 51 are rigidly connected to each other by a bar as clearly shown. These handles being thus rigidly connected, the disks 48 in the bearings 49 are constrained to move in unison when the pinion 52 is shifted from one to the other of the gears 53. This causes the bearings 48 always to be in alinement, which alinement is necessary for the proper intermeshing of the gears and smoothness of rotation, on account of the shortness of the shaft 45.

On the shaft 55 of the gear wheel 53 is mounted a sprocket wheel 56, which is connected by a chain 57 to a sprocket wheel 58 on the shaft 59. The shaft 59 is provided on its opposite end with a sprocket wheel 60, which is connected by a chain 61 to a sprocket wheel 62 fixedly-mounted on the end of a drive shaft 63. The shaft 63 has fixedly-mounted thereon a series of changeable feed gears 64. The gears 64 are of different sizes and are adapted to be engaged by a series of driving gears 65 fixedly-mounted upon a sleeve 66, which is keyed to and slidably-mounted on a drive-shaft 67 having mounted on one end a sprocket wheel 68. The sprocket wheel 68 is connected by a sprocket chain 69 to a sprocket wheel 70 on the main drive-shaft 2 of the machine, whereby motion from said shaft is imparted to the gears 65. The gears 65 are adapted to be shifted into engagement with one or the other of the gears 64, thus providing for the operation of the shaft 63 and the parts driven thereby at different speeds. The sleeve 66 and the gears 65 are adapted to be shifted by a suitable shifting lever 71, which is slidably-mounted on the frame of the machine and is provided on its inner end with a fork 72, which is engaged with an annular groove 73 formed in the adjacent ends of the sleeves 66, as shown. On the shaft 59 adjacent to the sprocket gear 58 is mounted a sprocket gear 74, which is connected by a chain 75 to a sprocket gear 76 on the end of the reel shaft 47, whereby the winding reel shaft 47 is revolved to wind the cable thereon. The shaft 59 is connected by the sprocket chain 61 to the changeable speed gear mechanism, which provides for the operation of the reel shaft 47 and reel 46 as well as the feed screw 45 at the desired speed. The feed screw shaft 45 is provided on one end with a crank handle 77, by means of which said shaft may be revolved by hand to shift the guide pulley and block to any desired position.

In order that the cable wound upon the reel or spool 46 may be measured, a suitable measuring and registering mechanism is provided. The measuring of the cable is accomplished by forming the guide pulley 43 with a circumference of exactly one foot, so that for each foot of cable passing around the pulley the latter will be turned one revolution. On one side of the pulley is arranged a tappet pin 78, which at each complete revolution of the wheel is adapted to be brought into engagement with the operating mechanism of a registering device, whereby each foot of cable is registered as it is wound upon the reel.

The registering device, 79, may be of any suitable construction and is herein shown in the form of an ordinary cyclometer, 79, secured to the bracket, 44, of the pulley, 43 and having a tappet wheel, 80, arranged in position to be engaged by the tappet pin, 78, on said pulley upon each revolution of the latter, thereby registering each foot of cable wound upon the spool, 46.

From the foregoing description, taken in connection with the accompanying drawings, the construction and operation of the invention may be readily understood without requiring a more extended explanation.

Various changes in the form, proportion and the minor details of construction may be resorted to without departing from the principle or sacrificing any of the advantages of this invention, as defined in the appended claims.

Having thus described my invention, what I claim as new, and desire to secure by Letters-Patent, is:

1. In a machine of the class described, a frame, mechanism thereon for forming a cable lightning rod having a core of a single wire and two layers of twisted wires wound upon the core, winding mechanism, disks rotatably mounted on the frame, and provided with rigidly connected handles, a screw shaft eccentrically mounted in said disks and provided with a gear pinion at one end, a traveling guide on said shaft, and two intermeshing gear wheels in position for being engaged by said pinion when the disks are rotated by said handles.

2. In a machine of the class described, a frame, cable forming and winding mechanisms thereon, spaced disks rotatably mounted on said frame and each carrying a bearing eccentric thereof, a screw shaft having its ends rotatably mounted in said bearings, and a gear pinion at one end of said shaft, intermeshing gear wheels, variable speed mechanism connected with one of said wheels, means for moving said disks in unison, whereby said pinion may mesh with either of said gear wheels, and a guide reciprocally mounted on said shaft.

3. In a machine of the class described, a frame, cable forming and winding mechanism thereon, a driving shaft on the frame provided with sprocket wheels, four shafts mounted on the frame adjacent to the winding mechanism, one of which is screw threaded and eccentrically mounted at both ends and provided with a pinion at one end, and two of the others being provided with variable speed mechanism and with a sprocket wheel at one end, a sprocket wheel at each end and on the intermediate portion of the fourth shaft, intermeshing gear wheels on the frame in position for being engaged by the pinion on the screw threaded shaft, one of which intermeshing wheels is connected with a sprocket wheel, sprocket chains from the three wheels on said fourth shaft to the last mentioned sprocket wheel, the winding mechanism and the sprocket wheel on one of said two shafts, respectively, a sprocket chain from the sprocket wheel on the other of said two shafts to the drive shaft, sprocket chains from the drive shaft to the forming mechanism, a reciprocatory guide block on the screw shaft, and unitary means for moving both ends of said screw shaft to cause its pinion to engage either of said intermeshing gear wheels.

4. In a machine of the class described, a frame, cable forming and winding mechanism thereon, intermeshing gear wheels, drive mechanism connected to one of said gear wheels, a screw shaft having a pinion adapted to intermesh with either of said gear wheels, spaced rotatable disks having bearings eccentric thereof adapted to rotatably support said screwshaft, handles to rotate said disks, a rod rigidly connecting the ends of said handles whereby said disks may move in unison and cause said pinions to engage either of said intermeshing gears, a guide reciprocally mounted on said screw shaft.

5. In a machine of the class described, a frame, a drive shaft, a cable forming and a cable winding mechanism thereon, said cable forming mechanisms being driven by chain and sprocket connections directly from said drive shaft, a sleeve bearing shaft having chain and sprocket connection with said drive shaft, a sleeve longitudinally slidable on said sleeve bearing shaft but rotatably fixed against rotation therewith, means to slide said sleeve, gear wheels on said sleeve, a gear bearing shaft having gears thereon adapted to engage the gears of said sleeve, a countershaft sprocket and chain connection between said gear bearing shaft and said countershaft, sprocket and chain connection between said countershaft and the drum of said winding mechanism, a screw shaft having a guide pulley mounted thereon to be moved back and forth thereby, eccentric disks in which both ends of said screw are mounted, rigidly connected handles forming unitary means by which said disks are rotated, a pinion on the end of said screwed shaft, intermeshing gears adapted either to be engaged by said pinion and a sprocket and chain connection between one of said intermeshing gears and said countershaft.

In testimony whereof I have hereunto set my hand in presence of two subscribing witnesses.

WILLIAM C. SHINN.

Witnesses:
WILEY ROY YOUNG,
MYRTLE CLARE YOST.